Figure 1:
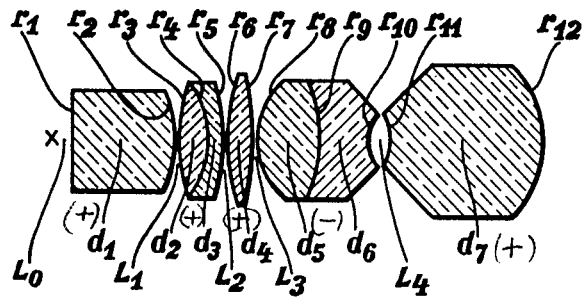

Patented July 7, 1953

2,644,943

UNITED STATES PATENT OFFICE 2,644,943

MICROSCOPE OBJECTIVE

Walter Klein, Dutenhofen (Kreis Wetzlar), Germany, assignor to Ernst Leitz, G. m. b. H., a corporation of Germany Application July 5, 1951, Serial No. 235,133
In Germany July 17, 1950

7 Claims. (Cl. 88—57)

This invention relates to microscope objectives of the type which include an improved leveling of the image field. It is known that the property of a so-called thick meniscus to produce a negative Petzval sum may be utilized to provide a miscroscope objective having a level image field. Of the two radii of such a meniscus having the same sign, the radius of the dispersing surface has the smaller absolute value and the thickness of the lens is greater than the radius of the dispersing surface. Such a meniscus may consist of two or more cemented lenses.

The British Patent 506,321, May 25, 1939, or U. S. Patent 2,206,155, dated July 2, 1940, discloses, for example, an objective in which two thick menisci are provided for the purpose of leveling the image field. One of these menisci is placed as the front lens, the other is the last lens on the image side. The hollow surfaces of the two menisci face in opposite directions so that the entrance surface facing the object is hollow. This arrangement carries with it certain disadvantages particularly in the case of immersion objectives. For this reason it has been proposed to fill the hollow space with a planoconvex lens having the smallest possible index of refraction.

The invention, therefore, has for its object to provide a microscope objective in which an almost planoconvex front lens is sufficient and whereby the advantageous properties of the thick meniscus may be made use of and the above mentioned additional means avoided.

The invention is embodied in a microscope objective which is particularly useful for immersion purposes and in which the front lens is almost planoconvex and two thick menisci are used for the leveling of the image field, the menisci having their hollow surfaces facing each other.

It is also in accordance with the invention advantageous to place two or more uncemented positive lenses behind the front lens with a very small air space between them.

The function of the proposed arrangement is that the two thick menisci have a negative Petzval sum which serves to cancel out the positive addition to the Petzval sum which comes from the front lens and the other lens elements. It is also advantageous that two negative surfaces face each other in a strongly confined pencil of light rays. The placing of the required number of positive lenses as close together as possible effects likewise a reduction in the positive value of the Petzval sum. This effect exists independently of the use of thick menisci.

The accompanying drawing illustrates in axial sections calculated examples of the invention from which it may be seen that the proposed arrangement according to the invention is effective in all cases. Fine correction which may be required thereafter is carried out in the usual manner and does not materially affect the advantages of the invention.

Figs. 1 through 4 illustrate calculated examples which contain the data set forth in the tables of values appearing hereinafter in the description of each of the figures in the drawing and also included in the claims which are to be read accordingly. In these tables the radii "$r$" of curvature, the lens-thicknesses "$l$", the axial distances "$d$" between lens elements and other dimensional details are enumerated and identified as follows, namely that $f_e$=the focal length for the $e$-line.
$A$=aperture.
$P$=Seidel-coefficient for the Petzval sum.
$\Gamma$=Seidel-coefficient for the astigmatism.
$B'_e$=the magnification.

Fig. 1 illustrates a lens system according to the invention in which the several lens elements shown in the drawing are characterized by the following values

| | | |
|---|---|---|
| $r_1 = \infty$ | $L_0 = 1.1990$ | |
| | $d_1 = 8.0$ | $n_d = 1.6073/59.5$ |
| $r_2 = -7.15$ | $L_1 = 0.1$ | |
| $r_3 = +15.0$ | $d_2 = 2.0$ | 1.3256/85.7 |
| $r_4 = -6.0$ | $d_3 = 1.0$ | 1.7383/28.3 |
| $r_5 = -12.31$ | $L_2 = 0.1$ | |
| $r_6 = +13.0$ | $d_4 = 2.0$ | 1.6204/60.3 |
| $r_7 = -18.5$ | $L_3 = 0.1$ | |
| $r_8 = +4.9$ | $d_5 = 4.1$ | 1.3921/99.8 |
| $r_9 = -9.03$ | $d_6 = 3.0$ | 1.7283/28.3 |
| $r_{10} = +2.55$ | $L_4 = 1.5$ | |
| $r_{11} = -3.41$ | $d_7 = 10.0$ | 1.6073/59.5 |
| $r_{12} = -675$ | $L_5 = \infty$ | |
| $f_e = +7.9748$ | $A = 0.50$ | $\Sigma P = -0.055$ | $\Sigma \Gamma = +0.074$ |

$L_0$=distance between front lens and object.
$L_5$=distance between last lens and the image.

Figure 2:
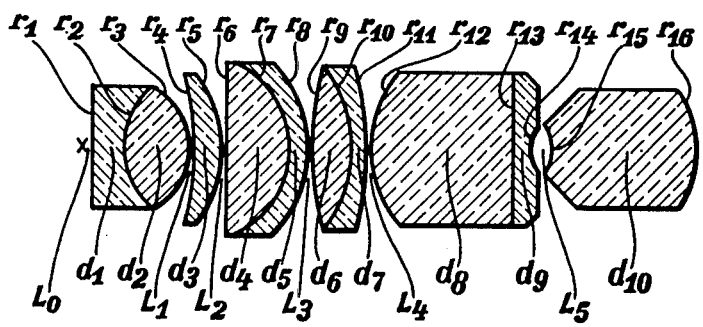

Fig. 2 illustrates a lens system according to the invention in which the several lens elements shown in the drawing are characterized by the following values:

| | | |
|---|---|---|
| $r_1 = -\infty$ | $L_0 = 0.1178$ | |
| $r_2 = + 5.0$ | $d_1 = 2.35$ | $n_d = 1.6727/32.2$ |
| $r_3 = - 4.18$ | $d_2 = 4.35$ | $1.6513/38.3$ |
| $r_4 = - 18.0$ | $L_1 = 0.1$ | |
| $r_5 = - 7.5$ | $d_3 = 2.0$ | $1.3921/99.8$ |
| $r_6 = +100.0$ | $L_2 = 0.01$ | |
| $r_7 = - 6.0$ | $d_4 = 4.5$ | $1.3921/99.8$ |
| $r_8 = - 7.8$ | $d_5 = 1.0$ | $1.7283/28.3$ |
| $r_9 = + 20.39$ | $L_3 = 0.01$ | |
| $r_{10} = - 8.5$ | $d_6 = 2.7$ | $1.3921/99.8$ |
| $r_{11} = - 20.39$ | $d_7 = 1.0$ | $1.7283/28.3$ |
| $r_{12} = + 7.5$ | $L_4 = 0.01$ | |
| $r_{13} = -\infty$ | $d_8 = 9.5$ | $1.6073/59.5$ |
| $r_{14} = + 2.2$ | $d_9 = 1.0$ | $1.7283/28.3$ |
| $r_{15} = - 2.81$ | $L_5 = 1.3$ | |
| $r_{16} = - 6.85$ | $d_{10} = 9.5$ | $1.6073/59.5$ |
| | $L_b = \infty$ | |
| $f_e = +3.2536$ | $A = 0.95$ | $\Sigma P = -0.054 \quad \Sigma \Gamma = +0.082$ |

Figure 3:
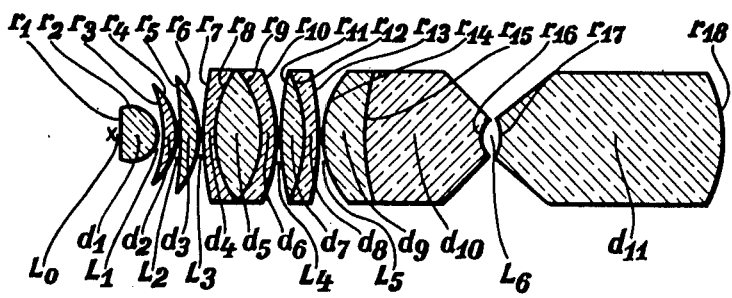

Fig. 3 illustrates a lens system according to the invention in which the several lens elements shown in the drawing are characterized by the following values:

| | | |
|---|---|---|
| $r_1 = \infty$ | $L_0 = 0.1923$ | $n_d = 1.5152/49.5$ |
| $r_2 = - 1.75$ | $d_1 = 2.70$ | $1.5182/65.2$ |
| $r_3 = - 7.50$ | $L_1 = 0.01$ | |
| $r_4 = - 4.00$ | $d_2 = 1.10$ | $1.6223/53.1$ |
| $r_5 = -26.50$ | $L_2 = 0.01$ | |
| $r_6 = - 5.65$ | $d_3 = 1.35$ | $1.4339/95.2$ |
| $r_7 = +19.07$ | $L_3 = 0.01$ | |
| $r_8 = + 7.50$ | $d_4 = 1.00$ | $1.6889/31.1$ |
| $r_9 = - 6.88$ | $d_5 = 3.10$ | $1.4339/95.2$ |
| $r_{10} = -10.00$ | $d_6 = 1.00$ | $1.6889/31.1$ |
| $r_{11} = +17.17$ | $L_4 = 0.01$ | |
| $r_{12} = - 9.03$ | $d_7 = 1.70$ | $1.4339/95.2$ |
| $r_{13} = -18.10$ | $d_8 = 1.00$ | $1.8052/25.5$ |
| $r_{14} = + 6.21$ | $L_5 = 0.01$ | |
| $r_{15} = +15.00$ | $d_9 = 2.80$ | $1.4339/95.2$ |
| $r_{16} = + 1.53$ | $d_{10} = 7.80$ | $1.7283/28.3$ |
| $r_{17} = - 2.6883$ | $L_4 = 1.10$ | |
| $r_{18} = - 8.82$ | $d_{11} = 14.2810$ | $1.6073/59.5$ |
| | $L_b = \infty$ | |
| $f_e = +1.5590$ | $A = 1.40$ | $\Sigma P = +0.023 \quad \Sigma \Gamma = -0.031$ |

Figure 4:
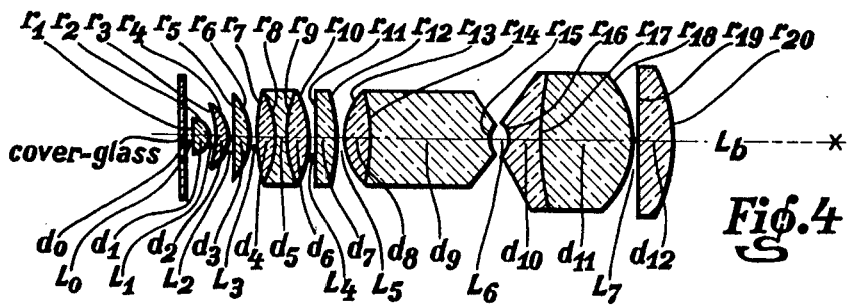

Fig. 4 illustrates a lens system according to the invention in which the several lens elements shown in the drawing are characterized by the following values:

| | | |
|---|---|---|
| $r_1 = \infty$ | $d_0 = 0.17$ $L_0 = 0.16928$ | $n_d = 1.5228/58.5$ $1.5152/49.5$ |
| $r_2 = - 1.06$ | $d_1 = 1.40$ | $1.5202/63.6$ |
| $r_3 = - 5.45$ | $L_1 = 0.05$ | |
| $r_4 = - 2.68$ | $d_2 = 1.00$ | $1.6237/47.0$ |
| $r_5 = -50.0$ | $L_2 = 0.05$ | |
| $r_6 = - 4.2$ | $d_3 = 1.15$ | $1.4339/95.2$ |
| $r_7 = +12.0$ | $L_3 = 0.30$ | |
| $r_8 = - 5.65$ | $d_4 = 1.35$ | $1.4339/95.2$ |
| $r_9 = + 7.49$ | $d_5 = 1.00$ | $1.7432/44.9$ |
| $r_{10} = - 6.58$ | $d_6 = 1.45$ | $1.4339/95.2$ |
| $r_{11} = -\infty$ | $L_4 = 0.30$ | |
| $r_{12} = -10.0$ | $d_7 = 1.50$ | $1.6073/59.5$ |
| $r_{13} = +4.385$ | $L_5 = 0.30$ | |
| $r_{14} = -12.0$ | $d_8 = 1.63$ | $1.4339/95.2$ |
| $r_{15} = +1.619$ | $d_9 = 8.10$ | $1.7283/28.3$ |
| $r_{16} = -1.619$ | $L_6 = 1.20$ | |
| $r_{17} = +20.0$ | $d_{10} = 2.00$ | $1.7283/28.3$ |
| $r_{18} = -6.2982$ | $d_{11} = 6.20$ | $1.6073/59.5$ |
| $r_{19} = -\infty$ | $L_7 = 0.20$ | |
| $r_{20} = -14.14$ | $d_{12} = 2.50$ | $1.6261/39.1$ |
| | $L_b = 164.50$ | |
| $B'_e = -102.305$ $\Sigma P = +0.154$ | $f_e = +2.3507$ $\Sigma \Gamma = -0.076$ | $A = 1.40$ |

The invention is not limited to the exact values set forth in the foregoing specification or in the appended claims. It is known in this art that changes in a stated value may be made and compensated for by a corresponding change in another related value. I claim therefore all such changes and modifications as come within the principle of the invention and the scope of the appended claims.

I claim:

1. Microscope objective comprising a front lens of substantially plano convex formation, two thick menisci positioned on the image side of said front lens near the rear end of said objective with their hollow surfaces facing each other to provide for leveling of the image field and disposed so close together that the center of curvature of the rearmost of the said two menisci is located axially in front of the center of curvature of the foremost of said menisci, both of said hollow surfaces being positioned in said objective at the point thereof where the pencil of rays is most restricted.

2. Microscope objective according to claim 1 characterized by that at least two uncemented positive lens elements are positioned behind the front lens, said elements being spaced very close together.

3. Microscope objective with leveled image according to claim 1 field characterized by that at least two uncemented positive lens elements are positioned very close behind the front lens.

4. Microscope objective providing for leveling of the image field having a front lens of substantially plano convex formation and two thick menisci the hollow surfaces of which face each other at the point where the pencil of rays is most restricted characterized by the following data:

| | | |
|---|---|---|
| $r_1 = \infty$ | $L_0 = 1.1990$ | |
| | $d_1 = 8.0$ | $n_d = 1.6073/59.5$ |
| $r_2 = -7.15$ | $L_1 = 0.1$ | |
| $r_3 = +15.0$ | $d_2 = 2.0$ | $1.3256/85.7$ |
| $r_4 = -6.0$ | $d_3 = 1.0$ | $1.7283/28.3$ |
| $r_5 = -12.31$ | $L_2 = 0.1$ | |
| $r_6 = +13.0$ | $d_4 = 2.0$ | $1.6204/60.3$ |
| $r_7 = -18.5$ | $L_3 = 0.1$ | |
| $r_8 = +4.9$ | $d_5 = 4.1$ | $1.3921/99.8$ |
| $r_9 = -9.03$ | $d_6 = 3.0$ | $1.7283/28.3$ |
| $r_{10} = +2.55$ | $L_4 = 1.5$ | |
| $r_{11} = -3.41$ | $d_7 = 10.0$ | $1.6073/59.5$ |
| $r_{12} = -675$ | $L_b = \infty$ | |
| $f_e = +7.9748$ $A = 0.50$ | $\Sigma P = -0.055$ $\Sigma \Gamma = +0.074$ | | wherein ($r$) written with subscript numerals designates the refracting lens surfaces counting from the front, and in like manner ($d$) designates the thicknesses of the lens elements and (L) designates the axial separation between the lens or components and in which table of data $f_e$ is the focal length for the $e$-line; A is the aperture; P the Seidel coefficient for the Petzval sum, and $\Gamma$ the Seidel coefficient for the astigmatism.

5. Microscope objective providing for leveling of the image field having a front lens of substantially plano convex formation and two thick menisci the hollow surfaces of which face each other at the point where the pencil of rays is most restricted characterized by the following data:

| | | |
|---|---|---|
| $r_1 = -\infty$ | $L_0 = 0.1178$ | |
| $r_2 = +5.0$ | $d_1 = 2.35$ | $n_d = 1.6727/32.2$ |
| $r_3 = -4.16$ | $d_2 = 4.35$ | $1.6513/38.3$ |
| $r_4 = -18.0$ | $L_1 = 0.1$ | |
| $r_5 = -7.5$ | $d_3 = 2.0$ | $1.3921/99.8$ |
| $r_6 = +100.0$ | $L_2 = 0.01$ | |
| $r_7 = -6.0$ | $d_4 = 4.5$ | $1.3921/99.8$ |
| $r_8 = -7.8$ | $d_5 = 1.0$ | $1.7283/28.3$ |
| $r_9 = +20.39$ | $L_3 = 0.01$ | |
| $r_{10} = -8.5$ | $d_6 = 2.7$ | $1.3921/99.8$ |
| $r_{11} = -20.39$ | $d_7 = 1.0$ | $1.7283/28.3$ |
| $r_{12} = +7.5$ | $L_4 = 0.01$ | |
| $r_{13} = -\infty$ | $d_8 = 9.5$ | $1.6073/59.5$ |
| $r_{14} = +2.2$ | $d_9 = 1.0$ | $1.7283/28.3$ |
| $r_{15} = -2.81$ | $L_5 = 1.3$ | |
| $r_{16} = -6.85$ | $d_{10} = 9.5$ | $1.6073/59.5$ |
| | $L_b = \infty$ | |
| $f_e = +3.2536$ $A = 0.95$ | $\Sigma P = -0.054$ $\Sigma \Gamma = +0.082$ | | wherein ($r$) written with subscript numerals designates the refracting lens surfaces counting from the front, and in like manner ($d$) designates the thicknesses of the lens elements and (L) designates the axial separation between the lens or components and in which table of data $f_e$ is the focal length for the $e$-line; A is the aperture; P the Seidel coefficient for the Petzval sum, and $\Gamma$ the Seidel coefficient for the astigmatism.

6. Microscope objective providing for leveling of the image field having a front lens of substantially plano convex formation and two thick menisci the hollow surfaces of which face each other at the point where the pencil of rays is most restricted characterized by the following data:

| | | |
|---|---|---|
| $r_1 = \infty$ | $L_0 = 0.1923$ | $n_d = 1.5152/49.5$ |
| | $d_1 = 2.70$ | $1.5182/65.2$ |
| $r_2 = -1.75$ | $L_1 = 0.01$ | |
| $r_3 = -7.50$ | $d_2 = 1.10$ | $1.6223/53.1$ |
| $r_4 = -4.00$ | $L_2 = 0.01$ | |
| $r_5 = -26.50$ | $d_3 = 1.35$ | $1.4339/95.2$ |
| $r_6 = -5.65$ | $L_3 = 0.01$ | |
| $r_7 = +19.07$ | $d_4 = 1.00$ | $1.6889/31.1$ |
| $r_8 = +7.50$ | $d_5 = 3.10$ | $1.4339/95.2$ |
| $r_9 = -6.68$ | $d_6 = 1.00$ | $1.6889/31.1$ |
| $r_{10} = -10.00$ | $L_4 = 0.01$ | |
| $r_{11} = +17.17$ | $d_7 = 1.70$ | $1.4339/95.2$ |
| $r_{12} = -9.03$ | $d_8 = 1.00$ | $1.8052/25.5$ |
| $r_{13} = -18.10$ | $L_5 = 0.01$ | |
| $r_{14} = +6.21$ | $d_9 = 2.80$ | $1.4339/95.2$ |
| $r_{15} = +15.00$ | $d_{10} = 7.80$ | $1.7283/28.3$ |
| $r_{16} = +1.53$ | $L_6 = 1.10$ | |
| $r_{17} = -2.6883$ | $d_{11} = 14.2810$ | $1.6073/59.5$ |
| $r_{18} = -8.82$ | $L_b = \infty$ | |
| $f_e = +1.5590$ $A = 1.40$ | $\Sigma P = +0.023$ $\Sigma \Gamma = -0.031$ | | wherein ($r$) written with subscript numerals designates the refracting lens surfaces counting from the front, and in like manner ($d$) designates the thicknesses of the lens elements and (L) designates the axial separation between the lens or components and in which table of data $f_e$ is the focal length for the $e$-line; A is the aperture; P the Seidel coefficient for the Petzval sum, and $\Gamma$ the Seidel coefficient for the astigmatism.

7. Microscope objective providing for leveling of the image field having a front lens of substantially plano convex formation and two thick menisci the hollow surfaces of which face each other at the point where the pencil of rays is most restricted characterized by the following data:

| | | |
|---|---|---|
| $r_1 = \infty$ | $d_0 = 0.17$ | $n_d = 1.5228/58.5$ |
| | $L_0 = 0.16928$ | $1.5152/49.5$ |
| $r_2 = -1.06$ | $d_1 = 1.40$ | $1.5202/63.6$ |
| $r_3 = -5.45$ | $L_1 = 0.05$ | |
| $r_4 = -2.68$ | $d_2 = 1.00$ | $1.6237/47.0$ |
| $r_5 = -50.0$ | $L_2 = 0.05$ | |
| $r_6 = -4.2$ | $d_3 = 1.15$ | $1.4339/95.2$ |
| $r_7 = +12.0$ | $L_3 = 0.30$ | $1.4339/95.2$ |
| $r_8 = -5.65$ | $d_4 = 1.35$ | $1.7432/44.9$ |
| $r_9 = +7.49$ | $d_5 = 1.00$ | $1.4339/95.2$ |
| $r_{10} = -6.58$ | $d_6 = 1.45$ | |
| $r_{11} = -\infty$ | $L_4 = 0.30$ | |
| $r_{12} = -10.0$ | $d_7 = 1.50$ | $1.6073/59.5$ |
| $r_{13} = +4.385$ | $L_5 = 0.30$ | |
| $r_{14} = -12.0$ | $d_8 = 1.63$ | $1.4339/95.2$ |
| $r_{15} = +1.619$ | $d_9 = 8.10$ | $1.7283/28.3$ |
| $r_{16} = -1.619$ | $L_6 = 1.20$ | |
| $r_{17} = +20.0$ | $d_{10} = 2.00$ | $1.7283/28.3$ |
| $r_{18} = -6.2982$ | $d_{11} = 6.20$ | $1.6073/59.5$ |
| $r_{19} = -\infty$ | $L_7 = 0.20$ | |
| $r_{20} = -14.14$ | $d_{12} = 2.50$ | $1.6261/39.1$ |
| | $L_8 = 164.50$ | |

| | |
|---|---|
| $B'_e = -102.305$ | $\Sigma P = +0.154$ |
| $f_e = +2.3507$ | $\Sigma \Gamma = -0.076$ |
| $A = 1.40$ | | wherein $(r)$ written with subscript numerals designates the refracting lens surfaces counting from the front, and in like manner $(d)$ designates the thicknesses of the lens elements and $(L)$ designates the axial separation between the lens or components and in which table of data $f_e$ is the focal length for the $e$-line; A is the aperture; P the Seidel coefficient for the Petzval sum, and $\Gamma$ the Seidel coefficient for the astigmatism and $B'_e$ is the magnification.

WALTER KLEIN.

References Cited in the file of this patent

UNITED STATES PATENTS

| Number | Name | Date |
|---|---|---|
| 1,578,259 | Boegehold | Mar. 30, 1926 |
| 1,761,441 | Foster | June 3, 1930 |
| 1,910,115 | Luboshez | May 23, 1933 |
| 2,050,024 | Sonnefeld | Aug. 4, 1936 |
| 2,206,155 | Boegehold | July 2, 1940 |